United States Patent
Perrino et al.

(10) Patent No.: US 12,534,406 B2
(45) Date of Patent: *Jan. 27, 2026

(54) ADHESIVE COMPOSITION

(71) Applicant: SIKA TECHNOLOGY AG, Baar (CH)

(72) Inventors: Luigi Perrino, Nago Torbole (IT); Tiziano Rattighieri, Modena (IT); Alberto Borghi, Campogalliano (IT); Corrado Scollo, Modena (IT); Daniela Hesselbarth, Zürich (CH); Luz Granizo, Madrid (ES)

(73) Assignee: SIKA TECHNOLOGY AG, Baar (CH)

( * ) Notice: Subject to any disclaimer, the term of this patent is extended or adjusted under 35 U.S.C. 154(b) by 1142 days.

This patent is subject to a terminal disclaimer.

(21) Appl. No.: 17/441,233

(22) PCT Filed: Mar. 23, 2020

(86) PCT No.: PCT/EP2020/058011
§ 371 (c)(1),
(2) Date: Sep. 20, 2021

(87) PCT Pub. No.: WO2020/200889
PCT Pub. Date: Oct. 8, 2020

(65) Prior Publication Data
US 2022/0153646 A1    May 19, 2022

(30) Foreign Application Priority Data
Mar. 29, 2019 (EP) ..................................... 19166172

(51) Int. Cl.
| | |
|---|---|
| *C04B 28/04* | (2006.01) |
| *C04B 14/24* | (2006.01) |
| *C04B 18/02* | (2006.01) |
| *C04B 24/26* | (2006.01) |
| *C04B 28/06* | (2006.01) |
| *C04B 103/00* | (2006.01) |
| *C04B 111/00* | (2006.01) |
| *C04B 111/40* | (2006.01) |
| *C04B 111/52* | (2006.01) |

(52) U.S. Cl.
CPC .............. *C04B 28/04* (2013.01); *C04B 14/24* (2013.01); *C04B 18/027* (2013.01); *C04B 24/2688* (2013.01); *C04B 28/065* (2013.01); *C04B 2103/0054* (2013.01); *C04B 2111/00637* (2013.01); *C04B 2111/40* (2013.01); *C04B 2111/52* (2013.01)

(58) Field of Classification Search
CPC ....... C04B 28/04; C04B 14/24; C04B 18/027; C04B 24/2688; C04B 28/065; C04B 2103/0054; C04B 2111/00637; C04B 2111/40; C04B 2111/52

See application file for complete search history.

(56) References Cited

U.S. PATENT DOCUMENTS

| | | | | |
|---|---|---|---|---|
| 11,884,593 | B2 * | 1/2024 | Perrino | ................... B32B 9/005 |
| 12,030,815 | B2 * | 7/2024 | Perrino | ................... C04B 14/24 |
| 2010/0190888 | A1 * | 7/2010 | Gaeberlein | ......... C04B 24/2688 |
| | | | | 524/5 |
| 2017/0283332 | A1 * | 10/2017 | Grisoni | ................... C04B 28/02 |
| 2022/0220034 | A1 * | 7/2022 | Perrino | ................... C04B 14/12 |

FOREIGN PATENT DOCUMENTS

| | | | |
|---|---|---|---|
| CN | 102249614 A | | 11/2011 |
| CN | 106542777 A | * | 3/2017 |
| CN | 108863249 A | | 11/2018 |
| DE | 10 2007 027 470 A1 | | 12/2008 |
| EP | 2 690 075 A1 | | 1/2014 |
| EP | 2 716 615 A1 | | 4/2014 |
| EP | 2 910 535 A1 | | 8/2015 |
| EP | 3 348 535 A1 | | 7/2018 |
| WO | 2008/151878 A1 | | 12/2008 |
| WO | 2011/015508 A1 | | 2/2011 |
| WO | 2014/093418 A1 | | 6/2014 |
| WO | 2015/179738 A1 | | 11/2015 |

OTHER PUBLICATIONS

English machine translation of CN 106542777. (Year: 2017).*
Shang et al., "Splashing flow glue for floor tiles, and construction method of splashing flow glue," XP002794624, Thomson Scientific, Nov. 23, 2018.
Jun. 23, 2020 International Search Report issued in International Patent Application No. PCT/EP2020/058011.
Jun. 23, 2020 Written Opinion of the International Searching Authority issued in International Patent Application No. PCT/EP2020/058011.

* cited by examiner

*Primary Examiner* — Angela C Scott
(74) *Attorney, Agent, or Firm* — Oliff PLC

(57) ABSTRACT

An adhesive composition, in particular a tile adhesive, includes: a) 10-50 wt. % of a hydraulic binder, b) 20-60 wt. % of lightweight aggregates, c) 10-25 wt. % of a polymer.

14 Claims, No Drawings

ADHESIVE COMPOSITION

TECHNICAL FIELD

The invention relates to an adhesive composition, in particular a tile adhesive. Further objects of the invention are a method for producing a processable adhesive composition, a hardened adhesive composition and the use of the adhesive composition. Moreover the invention relates to a structure, in particular a floor, a wall or a ceiling, comprising a cover element, in particular a tile, whereby the cover element is fixed to the structure with an adhesive composition

BACKGROUND ART

From decorative tiled surfaces to highly functional tiled wall and floor finishes, tiling is one of the most popular surface finishing techniques that are used to enhance the appearance and functionality of all types of buildings and facilities.

A tiled structure typically comprises (i) a substrate, e.g. a supporting structure, (ii) (ii) optionally an underlayment, (iii) an adhesive, (iv) tiles, e.g. in the form of ceramic tiles, stones and/or veneers, as well as (v) grouted joints and movement joints between the tiles. Thereby, tiles are fixed to the substrate with the adhesive. Depending on their composition, according to standard EN 12004:2017, tile adhesives are grouped into 3 main types: cementitious adhesives (C), dispersion adhesives (D) and reaction resin adhesives (R). Cementitious adhesives typically contain inter alia hydraulic cement, sand and fillers.

WO 2015/179738 A1 (Laticrete International, Inc.) describes for example ready to use grout and/or adhesive formulations that are suitable for use as a ceramic tile adhesive or as a tile grout, filling spaces between ceramic tiles. The formulations are based on a premixed cementitious slurry and an activation constituent for destabilizing the slurry by increasing its pH.

However, in buildings or facilities, the transmission of undesired sound or vibrations trough structural elements, floors, walls or ceilings is a challenging problem. Therefore, tiled surfaces are not only expected to be visually appealing and functional, but to contribute to noise or vibration suppression.

Although there are adhesive compositions that are highly beneficial in terms of processability, adhesion, durability, temperature resistance or deformation, they do not sufficiently contribute to noise or vibration suppression or they have other drawbacks.

There is thus a need to provide improved solutions, which overcome the aforementioned drawbacks.

DISCLOSURE OF THE INVENTION

It is an object of the present invention to provide an advantageous adhesive composition, which is in particular beneficial for use in tiled structures. Preferably, the adhesive should be easy to process, have a sufficient pot life, and have good adhesion to different kind of materials, in particular to mortar, concrete, wood and metals. At the same time, the adhesive should contribute to noise or vibration reduction, especially in tiled structures.

Surprisingly, it has been found that the object can be achieved by the features of claim 1. Thus, the core of the invention is an adhesive composition, in particular a tile adhesive, comprising or consisting of:

a) 10-50 wt. % of a hydraulic binder,
b) 20-55 wt. % of lightweight aggregates,
c) 10-20 wt. % of a polymer.

Preparing the adhesive composition is quite easy and safe: The adhesive composition, in particular in dry state, is mixed with an appropriate amount of water. After this, the adhesive composition is ready for tiling or other applications.

Furthermore, the adhesive composition itself can be a one-component mixture. This will exclude the risk of a mix-up or wrong dosing of individual components by users.

After mixing with water, the inventive adhesive compositions are easy to process. Especially, mixed compositions have a consistency, which allows for an application on vertical surfaces and overhanging areas without dripping. In addition, pot lifes of around 30 minutes can be achieved which allows for efficient tiling.

As could be shown, the adhesive compositions feature good adhesion to different kind of materials, in particular to mortar, concrete, ceramics, wood and metals, such as e.g. steel, aluminum and zinc. Especially, the adhesive compositions feature highly beneficial adhesion properties with different types of tiles and veneers. In particular, properties according to criteria C2E S2 according to EN 12004-1:2017 can be achieved.

At the same time, the adhesive composition helps to suppress noise and/or vibrations in tiled structures. For example, foot traffic noise can be reduced significantly on tiled floorings. Specifically, impact noise reductions from 1-10 dB could be observed (according to ISO 10140-3:2010 and ISO 717-2).

Furthermore, the inventive adhesive compositions can be formulated to be rather fast-drying. Therefore, the adhesive composition is suitable for low- and non-absorbent cover elements or tiles, respectively.

Additional aspects of the invention are subject of further independent claims. Particularly preferred embodiments are outlined throughout the description and the dependent claims.

WAYS OF CARRYING OUT THE INVENTION

A first aspect of the present invention is directed to an adhesive composition, in particular a tile adhesive, comprising or consisting of:

a) 10-50 wt. % of a hydraulic binder,
b) 20-60 wt. % of lightweight aggregates,
c) 10-20 wt. % of a polymer.

In particular, all amounts are with respect to the total weight of the adhesive composition in dry state.

In the present context, the expression "hydraulic binder" in particular stands for substances that harden because of chemical reactions with water producing hydrates. Preferably, the hydrates produced are not water-soluble. In particular, the hydration chemical reactions of the hydraulic binder takes essentially place independently of the water content. This means that the hydraulic binder can harden and retain its strength even when exposed to water, e.g. underwater or under high humid conditions.

The term "lightweight aggregates" stands in particular for aggregates with a particle density $\leq 2,000$ kg/m$^3$, preferably $\leq 1,500$ kg/m$^3$, especially $\leq 1,250$ kg/m$^3$. The particle density of an aggregate is the ratio between the mass of the particle material and the volume occupied by the individual particles. This volume includes the pores within the particle, but does not include voids between the particles. Especially, the particles of the aggregates can have any spherical and/or non-spherical geometric shape, either uniform or non-uniform. For example, the particles can be spherical-, conical-, polygonal-, cubic-, pentagon-, hexagon-, octagon-, prismatic and/or polyhedral-shaped. Non-uniform particles can have for example circular, elliptical, oval, square, rectangular, triangular or polygonal cross sections found at least partially therein. "Non-uniform" and "irregular" shaped particles refer to three-dimensional particle shapes wherein at least two different cross sections taken through said particles have different shapes.

Especially, the adhesive composition is a dry adhesive composition. This means that the adhesive composition is essentially free of water or an amount of water is below 1 wt. %, in particular below 0.5 wt. % or below 0.1 wt. %, with respect to the total weight of the adhesive composition.

According to a preferred embodiment, the adhesive composition is a one-component mixture. That means that all the individual materials and/or substances are intermixed. One-component compositions are in particular easy to handle and exclude the risk of a mix up or wrong dosing of individual components by users.

However, it is in principle possible to provide a two-component adhesive composition or even a multi-component adhesive composition. A first component may e.g. be present in a first receptacle comprising the hydraulic binder and the polymer. A second component, present in a second receptacle, may comprise the aggregates. Other distributions are possible as well. Two- or multi-component adhesive compositions allow e.g. for adjusting the adhesive composition with regard to specific applications.

A preferred amount of hydraulic binder is 21-50 wt. %, in particular 25-45 wt. %, especially 30-40 wt. %, with respect to the total weight of the adhesive composition in dry state.

Preferably, a weight ratio of the polymer to the hydraulic binder in the adhesive composition is from 0.1-5, in particular, 0.2-2.5, especially, 0.2-1, particularly 0.3-0.8 or 0.3-0.6.

Preferably, the hydraulic binder comprises or consists of cement. Preferably, the cement is Portland cement and/or alumina cement and/or sulphoaluminate cement.

Preferred Portland cement is according to norm EN 197, in particular of type CEM 1. The term "alumina cement" stands in particular for a cement with an aluminum content, measured as $Al_2O_3$, of at least 30 wt. %, especially at least 35 wt. %, in particular 35-58 wt. %. Preferably, the alumina cement is alumina cement according to standard EN 14647. Preferably, the sulphoaluminate cement is calcium sulphoaluminate cement.

A preferred amount of Portland cement is 10-40 wt. %, in particular 20-35 wt. %, especially 25-30 wt. %, with respect to the total weight of the adhesive composition in dry state.

In particular, the hydraulic binder comprises two different types of Portland cements, especially two types of Portland cements of different strength classes. Especially, a Portland cement of strength class 42.5 N is combined with a Portland cement of strength class 52.5 N. Strength classes are according to EN 197-1:2011.

Preferably, a proportion of the cement with the lower strength class is higher that the proportion of the cement with the higher strength class. In particular, the proportion of the cement with the lower strength class is a factor of 1.5-5 higher than the proportion of the cement with the lower strength class.

Such a mix of different Portland cements turned out to be highly beneficial in terms of noise suppression, adhesion and strength development of the hardened adhesive composition.

Preferably, the adhesive composition comprises alumina cement and/or sulphoaluminate cement, preferably sulphoaluminate cement. In particular, a proportion of these cements is from 1-15 wt. %, in particular 3-10 wt. %, especially, 4-7 wt. %, with respect to the total weight of the adhesive composition in dry state.

According to a further preferred embodiment, the hydraulic binder comprises Portland cement and sulphoaluminate cement, in particular calcium sulphoaluminate cement.

Even more preferred, the hydraulic binder comprises two different types of Portland cements, especially two types of Portland cements of different strength classes, in combination with a sulphoaluminate cement, in particular calcium sulphoaluminate cement. The two types of Portland cements of different strength classes are in particular chosen as described above.

Sulphoaluminate cements, especially in combination with Portland cements, have been proven to be especially advantageous in the present context.

A weight ratio of Portland cement to sulphoaluminate cement is preferably from 2-10, especially 3-8, in particular 4-7 or 5-6.

According to a preferred embodiment, the adhesive composition comprises 10-40 wt. %, in particular 20-35 wt. %, especially 25-30 wt. %, Portland cement and 1-15 wt. %, in particular 3-10 wt. %, especially, 4-7 wt. %, sulphoaluminate cement as hydraulic binder each with respect to the total weight of the adhesive composition in dry state. Also in this case, preferably, two types of Portland cements of different strength classes are chosen, as described above.

Moreover, the hydraulic binder can optionally comprise or consist of latent hydraulic and/or pozzolanic binder materials. The term "latent hydraulic and/or pozzolanic binder materials" stands in particular for type II concrete additives with latent hydraulic and/or pozzolanic character according to EN 206-1. In particular, the latent hydraulic or pozzolanic binder material comprises or consists of slag, fly ash, silica fume, metakaolin and/or natural pozzolanes. Thereby, slag, in particular furnace slag is especially preferred.

Preferably, a proportion of the latent hydraulic and/or pozzolanic binder materials is from 0.5-20 wt. %, in particular 2-10 wt. %, especially 3-7 wt. %, with respect to the total weight of the adhesive composition in dry state.

According to a preferred embodiment, the hydraulic binder comprises in combination:
- 10-40 wt. %, in particular 20-35 wt. %, especially 25-30 wt. %, Portland cement, with respect to the total weight of the adhesive composition in dry state; and
- 1-15 wt. %, in particular 3-10 wt. %, especially, 4-7 wt. %, sulphoaluminate cement, with respect to the total weight of the adhesive composition in dry state. Also in this case, preferably, two types of Portland cements of different strength classes are chosen, as described above; and
- from 0.5-20 wt. %. in particular 2-10 wt. %, especially 4-8 wt. %, latent hydraulic and/or pozzolanic binder materials, especially slag and/or fly ash, with respect to the total weight of the adhesive composition in dry state.

With regard to the lightweight aggregates, a particle density of the lightweight aggregates is preferably from 100-2,000 $kg/m^3$, especially 400-1,900 $kg/m^3$, preferably 700-1,500 $kg/m^3$ or 800-1,300 $kg/m^3$.

Especially, a proportion of the lightweight aggregates is from 20-50 wt. %, in particular 25-55 wt. %, especially 35-45 wt. %, with respect to the total weight of the adhesive composition in dry state.

Preferred lightweight aggregates comprise or consist of wood particles, rubber particles, plastic particles and/or porous particles, especially porous inorganic particles. More preferred particles are rubber particles and/or porous particles. Most preferred particles are rubber particles.

In the present context, the term "rubber" stands in particular for an elastomer, especially a thermoset. Rubber particles can consist of natural and/or synthetic rubber. The rubber is chemically different from the above-mentioned polymer.

In particular, the rubber particles comprise or consist of natural polyisoprene; synthetic polyisoprene; polybutadiene; chloroprene rubber, such as e.g. polychloroprene, neoprene, baypren; butyl rubber, in particular copolymers of isobutylene and isoprene; halogenated butyl rubber, such as e.g. chloro butyl rubber, bromo butyl rubber; styrene-butadiene rubber, in particular copolymers of styrene and butadiene, nitrile rubber, in particular a copolymer of butadiene and acrylonitrile and/or hydrogenated nitrile rubber.

For example, the rubber particles are recycled rubber particles, in particular obtained from worn shoes and/or tires.

For example, the rubber particles are derived from rubber products, e.g. end-of-life tires, through cryogenic milling.

In a further preferred embodiment, the lightweight aggregates comprise or consist of porous particles. In particular, the porous particles have a porosity of at least 25 vol. %, especially at least 50 vol. %, in particular at least 75 vol. %, with respect to the total volume of the porous particles.

Especially, the porous particles are chosen from expanded polystyrene granules, expanded silica, volcanic rock, e.g. pumice and/or perlite. Expanded silica is highly preferred.

However, the lightweight aggregates may also comprise or consist of cork and/or plastics, in particular recycled plastics. For example, the lightweight aggregates comprise or consist of polyethylene terephthalate (PET).

Preferably, a particle size of the lightweight aggregates is from 0.01-2 mm, especially 0.05-1.5 mm, preferably 0.1-1.0 mm, in particular 0.1-0.6 mm. This is in particular true independently of the type of lightweight aggregate used.

The particle size can e.g. be determined by laser diffraction as described in ISO 13320:2009. Preferably, a particle size of non-spherical or irregular particles is represented by the equivalent spherical diameter of a sphere of equivalent volume. Especially, the lower values of the ranges given for the particle size represent D1 values whereas the upper values of the ranges given for the particle size represent D99 values. Put differently, in this case, 1% of the particles have a lower particle size than the lower value of a range, whereas 1% of the particles have a larger particle size than the upper value of a range.

Especially, the adhesive composition comprises 30-60 wt. %, especially 35-55 wt. %, of rubber particles and 1-15 wt. %, especially 3-10 wt. %, of porous particles, preferably porous inorganic particles, as lightweight aggregates. Thereby expanded silica or glass is most preferred as inorganic particles.

According to a highly preferred embodiment, a proportion of aggregates with a particle density >2,000 kg/m$^3$, especially >2,100 kg/m$^3$ or >2,200 kg/m$^3$, is <25 wt. %, especially <10 wt. %, preferably <5 wt. % or <1 wt. %, with respect to the weight of the dry mortar composition. In particular, the adhesive composition does not comprise any aggregates with a particle density >2,000 kg/m$^3$, especially >2,100 kg/m$^3$ or >2,200 kg/m$^3$.

Especially, a proportion of sand, quartz, calcium carbonate, natural river sand, gravel, basalt and/or metallic aggregates is <25 wt. %, especially <10 wt. %, preferably <5 wt. % or <1 wt. %. Especially, the adhesive composition does not comprise any of such aggregates.

Preferably, the polymer used in the adhesive composition is a water-soluble or water-redispersible polymer, in particular a redispersible polymer. Such polymers have proven to be beneficial in the present adhesive compositions. However, e.g. for specific purposes, other polymers might be suitable as well.

Preferably, the polymer is present in solid state, especially as a powder.

Especially, the polymer is used as a binder in order to control strength of the adhesive composition.

Preferably, the polymer has a glass transition temperature of −45-10° C., especially −35-5° C., preferably −25-0° C., in particular −20-0° C., particularly preferred −20--10° C. Such polymers can further improve the strength and noise suppression properties of the adhesive composition. Most preferred are redispersible polymers with these glass transition temperatures.

The glass transition temperature is determined by Differential Scanning Calorimetry according to standard ASTM E1356-08(2014).

Especially, the polymer is a homopolymer or copolymer based on one or more monomers selected from a vinyl ester, vinyl acetate, vinyl alcohol, vinyl chloride, vinyl laureate, acrylic acid, acrylate, methacrylic acid, methacrylate, methylmethacrylate, acrylonitrile, styrene, butadiene, ethylene or mixtures thereof.

Highly preferred are copolymers based on vinyl esters, ethylene and acrylic acid esters.

Preferably, the polymer is selected from poly(vinyl acetate-ethylen), poly(vinyl acetate-ethylen-methylmethacrylate), poly(vinyl acetate-ethylen-vinylester), poly(vinyl acetate-ethylen-acrylic acid ester), poyl(vinyl acetate-ethylen-vinyl laureate), poly(vinyl acetate-vinyl versate), poly(acrylic ester-acrylonitrile), poly(acrylic ester-styrene butadiene) or mixtures thereof. Highly preferred as the polymer is a poly(vinyl ester-ethylene-acrylic acid ester).

However, other polymers might be suitable as well.

A preferred amount of the polymer is 10-20 wt. %, in particular 12-18 wt. %, especially 13-17 wt. %, with respect to the total weight of the adhesive composition.

Preferably, a weight ratio of the lightweight aggregates to the polymer is from 1-10, in particular 1.5-7, especially 2-5. This is in particular true if the lightweight aggregates comprise or consist of rubber and the polymer is a redispersibale polymer.

Furthermore, it can be beneficial if the adhesive composition comprises at least one additive selected from the group consisting of setting time regulators, plasticizers, defoamers, rheology modifiers, thixotropic agents, aerating and/or foaming agents, anti-shrinkage agents, corrosion inhibitors, fire-retarding agents, fibers, and chromium reducers.

Preferably, a proportion of the additives in total is from 0-5 wt. %, especially 1-5 wt. % with respect to the weight of the adhesive composition in dry state.

Preferably, the adhesive composition comprises a layered silicate, in particular a phyllosilicate, as an additive. Preferably, the layered silicate is a bentonite or an aluminum phyllosilicate. Especially, a layered silicate is used in combination with rubber particles as described above. As it turned out, layered silicates help to stabilize rubber particles in the adhesive composition.

A proportion of the layered silicate is preferably from 0.01-2 wt. %, in particular 0.1-1 wt. %, especially 0.2-0.7 wt. %, with respect to the weight of the adhesive composition in dry state.

Especially the adhesive composition comprises a thixotropic agent, in particular silica, silica fume, cellulose, and/or saccharides. A proportion of the thixotropic agent is preferably from 0.001-1 wt. %, in particular 0.1-0.5 wt. %, with respect to the weight of the adhesive composition in dry state.

According to another preferred embodiment, the adhesive composition comprises a plasticizer, whereby the plasticizer is in particular selected from the group of lignosulfonates, gluconates, naphtalenesulfonates, melamine sulfonates, vinyl copolymers and/or polycarboxylate ethers. Polycarboxylate ethers are preferred. In particular, the plasticizer is chemically different from the above-mentioned polymer and rubber. A proportion of polycarboxylate ethers is preferably from 0.001-1 wt. %, in particular 0.1-0.5 wt. %, with respect to the weight of the adhesive composition in dry state.

Preferably, the adhesive composition comprises fibers, in particular glass, plastic and/or cellulose fibers. Glass fibers are highly preferred. A proportion of the fibers is preferably from 0.001-3 wt. %, in particular 0.01-2.0 wt. %, especially 0.1-1 wt. %, with respect to the weight of the adhesive composition in dry state. A preferred length of the fibers is from 0.5-12 mm, especially 2-5 mm. A diameter of the fibers is for example 0.5-1,000 µm, especially 1-100 µm, in particular 5-40 µm.

A preferred adhesive composition comprises or consists of:
- 25-45 wt. % of hydraulic binder, especially comprising Portland cement, and sulphoaluminate cement and optionally fly ash;
- 35-55 wt. % of rubber particles, especially with a particle size of 0.1-1.0 mm, preferably 0.1-0.6 mm;
- 10-25 wt. % of a water redispersible polymer, especially with a glass transition temperature of $-20$--$10°$ C.;
- 0-5 wt. %, especially 1-5 wt. %, of one or more additives; and
- wherein, preferably, a proportion of aggregates with a particle density >2,000 kg/m$^3$ is <5 wt. % or <1 wt. %.

whereby the proportions are with respect to the weight of the adhesive composition in dry state.

A highly preferred adhesive composition comprises or consists of:
- 20-30 wt. % of Portland cement, especially of two different types of Portland cement;
- 3-10 wt. % of calcium sulphoaluminate cement;
- optionally 4-8 wt. % latent hydraulic and/or pozzolanic binder materials, especially slag and/or fly ash;
- 35-55 wt. % of rubber particles, especially with a particle size of 0.1-1.0 mm, preferably 0.1-0.6 mm;
- 3-10 wt. % of porous inorganic particles, especially with a particle size of 0.1-0.6 mm;
- 10-25 wt. % of a water redispersible polymer, especially with a glass transition temperature of $-20$-$0°$ C.;
- 0-5, especially 1-5 wt. %, of one or more additives; and
- wherein, preferably, a proportion of aggregates with a particle density >2,000 kg/m$^3$ is <5 wt. % or <1 wt. %.

whereby the proportions are with respect to the weight of the adhesive composition in dry state.

Another aspect of the present invention relates to a method for producing a processable adhesive composition, comprising the step of adding water to an adhesive composition as described above.

Thereby, preferably, a weight ratio of water to the adhesive composition in dry state is from 0.25-0.5, in particular 0.27-0.4, especially 0.30-0.35.

A further aspect of the present invention is a hardened adhesive composition obtainable by adding water to an adhesive composition as described above or obtainable by the method as described above.

Preferably, the adhesive composition exhibits one or more of the following properties (according to EN 12004-1/2: 2017 and EN 1346, EN 1348):
- Initial adhesion (after dry storage) ≥0.5, especially ≥1.0 MPa
- Adhesion after water immersion ≥0.5, especially ≥1.0 MPa
- Adhesion after heating ≥0.5, especially ≥1.0 MPa
- Adhesion after freeze-thaw cycles ≥0.5, especially ≥1.0 MPa
- Extended open time ≥0.5 MPa after 10 minutes, especially after 20 minutes, preferably after 30 minutes
- Transversal deformation ≥5 mm Preferably, the adhesive composition fulfils criteria C1E S2, especially C2E S2, according to standard EN 12004: 2017.

A further aspect of the present invention relates to a structure, in particular a floor, a wall or a ceiling, comprising support element and a cover element, in particular a tile, whereby the cover element is fixed to the support element with an adhesive composition as described above. Especially, the adhesive composition is arranged between the support element of the structure and the cover element.

Preferably, a thickness of the adhesive composition in the structure is from 1-10 mm, in particular 2-7 mm, especially 3-5 mm.

Optionally, it is possible to have an additional primer layer and/or intermediate layer between the support element and the adhesive composition and/or between the adhesive composition and the cover element. This might further increase the adhesion between the support element and cover element and/or help to achieve even better noise or vibration suppression.

In particular, the support element is a floor, a wall or a ceiling made essentially of mortar, concrete, bricks, plaster, metal, plastics and/or wood. Preferably, the cover element is a tile in the form of a ceramic tile, a stone and/or a veneer.

Another aspect of the present invention relates to a method for the production of a structure, whereby the adhesive composition of the present invention is mixed with water, applied on a support element and covered with a cover element. Thereby, the support element and the cover element are defined as described above.

Preferably, the adhesive composition is applied with a thickness from 1-10 mm, in particular 2-7 mm, especially 3-5 mm.

An additional aspect of the present invention relates to the use of the adhesive composition as herein described. Especially, the adhesive composition is used as a tile adhesive, in particular to fix tiles on a support element, e.g. on a wall, ceiling and/or floor.

According to another preferred embodiment, the adhesive composition and/or hardened composition as described herein is used for acoustic damping, noise reduction and/or vibration reduction, in particular on floors, walls or ceilings of buildings and/or facilities. Especially, the adhesive composition is used for impact noise reduction.

Further advantageous configurations of the invention are evident from the exemplary embodiments.

EXEMPLARY EMBODIMENTS

Table 1 shows six adhesive compositions C1-C7. The adhesive compositions have been prepared by intermixing all of the components in dry state. The adhesive composition C1-C7 are present as dry powders.

TABLE 1

Adhesive compositions

| Component | C1 | C2 | C3 | C4 | C5 | C6 | C7 |
|---|---|---|---|---|---|---|---|
| Hydraulic binder [wt. %] | | | | | | | |
| Portland cement (CEM I, 42.5N) | 20 | 25 | 25 | 30 | 20 | 20 | 35 |
| Portland cement (CEM I, 52.5N) | 10 | — | — | — | 5 | — | — |
| Calcium sulphoaluminate cement[1] | 5 | 5 | 5 | — | 5 | 10 | — |
| Fly ash | 4 | 5 | 5 | 5 | 4 | 5 | 5 |
| Slag | 2 | — | — | — | 2 | — | — |
| Lightweight aggregates [wt. %] | | | | | | | |
| Rubber[2] | 36 | — | 41 | 41 | 41 | — | — |
| Rubber[3] | — | 41 | — | — | — | 41 | 41 |
| Expanded glass[4] | 5 | 5 | 5 | 5 | 5 | 5 | 5 |
| Polymer [wt. %] | | | | | | | |
| Redispersible copolymer[5] | 15 | 16 | 16 | 16 | 15 | 17 | 12 |
| Additives [wt. %] | | | | | | | |
| Plasticizer[6] | 0.1 | 0.1 | 0.1 | 0.1 | 0.1 | 0.1 | 0.1 |
| Fibers[7] | 0.5 | — | 0.5 | 0.5 | 0.5 | — | — |
| Accelerator[8] | 1.2 | 1.2 | 1.2 | 1.2 | 1.2 | 1.2 | 1.2 |
| Layered silicate | 0.5[#] | 0.3[9] | 0.3[9] | 0.3[9] | 0.5[#] | 0.3[9] | 0.3[9] |
| Processing additives[10] | 0.7 | 1.4 | 0.9 | 0.9 | 0.7 | 0.4 | 0.4 |

[1] Alicem, available from Heidelberg Cement, Germany
[2] Genan 40 Mesh, particle size: 180-425 μm, Genan GmbH, Germany
[3] Prismatic rubber particles, particle size 0.1-0.4 mm
[4] Poraver, particle size 0.1-0.3 mm, Dennert Poraver GmbH, Germany
[5] Semi-flexible vinylacetate-ethylene-acrylicacid ester terpolymer
[6] Sika Viscocrete 125 P, polycarboxylate ether, Sika Germany
[7] Cem-Fil, type 70/30, glass fibers, 3 mm length, 20 μm diameter, Owens Corning Composite Materials LLC, USA
[8] Calcium formate and Aluminium sulphate
[9] Optibent 602, phyllosilicate, Byk-Chemie GmbH, Germany
[#] 1:1 mixture of Optibent 602 and Optibent NT10, phyllosilicates, Byk-Chemie GmbH, Germany
[10] Defoamer, rheology modifiers, thixotropic agents Adhesive compositions C1-C7 have been mixed with water (weight ratio of water to total weight of dry mortar composition=0.32-0.37) in order to obtain processable compositions.

Tests with the adhesive composition in line with EN 12004-1/2:2017 revealed that properties according to criteria C1E S2 and C2E S2 are achievable.

Furthermore, the adhesive composition have been tested according to the following method:
1) The adhesive composition to be tested is spread on a test surface. Thereby, the workability of the adhesive composition is evaluated by eye and on the basis of haptics during spreading. The workability ranges from 1 (lowest workability) to 4 (best workability)
2) A standardized tile is applied on the spread-out adhesive composition. The test tile is a tile conforming to EN 14411:2006; water absorption: >0,5%, unglazed, with a flat adhesive surface and surface dimensions of (60±1) mm×(60±1) mm.
3) After 24 hours the test tile is removed by hand. It is then qualitatively assessed whether the tile has adhered well and whether mortar residues remain on the tile. This is taken as a measure for the hardening of the adhesive composition under the test tile. The hardening ranges from 1 (lowest hardening) to 4 (best hardening)

Table 2 shows the results for the workability and hardening properties of adhesive compositions.

TABLE 2

Workability and hardening properties of adhesive compositions

| Adhesive Composition → Property ↓ | C1 | C2 | C3 | C4 | C5 | C6 | C7 |
|---|---|---|---|---|---|---|---|
| Workability | 4 | 1 | 3 | 3 | 3 | 1 | 1 |
| Hardening after 24 hours | 4 | 2 | 3 | 1 | 4 | 2 | 1 |

While all of the adhesive compositions have a workability and hardening properties under tiles which makes them useful for practical applications, composition C1 and C5 with a special balance between two types of Portland cements and a Calcium sulphoaluminate cement showed the best performance in the internal tests.

Additionally, a floor made of concrete was covered with ceramic tiles. Thereby, the ceramic tiles were fixed to the concrete support with the adhesive composition C1 (layer thickness≈4 mm). Compared to conventional tile adhesives, the inventive compositions showed a significant decrease of foot traffic noise, presumably due to its high deformability. Specifically, impact noise reductions ΔLw of about 1-10 dB (internal tests similar to ISO 10140-3:2010 and ISO 717-2) with covering tiles could be observed when using inventive adhesive compositions.

Thus, it will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:
1. An adhesive composition, comprising:
   a) 10-50 wt. % of a hydraulic binder,
   b) 20-60 wt. % of lightweight aggregates,
   c) 10-25 wt. % of a polymer,
   wherein the hydraulic binder comprises Portland cement and sulphoaluminate cement with a weight ratio of Portland cement to sulphoaluminate cement from 4-10.
2. The adhesive composition according to claim 1, wherein the hydraulic binder comprises two different types of Portland cements.
3. The adhesive composition according to claim 1, wherein the composition comprises 10-40 wt. % Portland cement and 1-15 wt. % sulphoaluminate cement as hydraulic binders.
4. The adhesive composition according to claim 1, wherein a particle density of the lightweight aggregates is from 100-2,000 kg/m$^3$.
5. The adhesive composition according to claim 1, wherein the lightweight aggregates comprise rubber particles and/or porous particles, whereby, a particle size of the lightweight aggregates is from 0.01-2 mm.

6. The adhesive composition according to claim 5 wherein the composition comprises 30-60 wt. %, of rubber particles and 1-15 wt. % of porous particles as lightweight aggregates.

7. The adhesive composition according to claim 1, wherein the polymer is a water soluble or water redispersible polymer.

8. The adhesive composition according to claim 7, wherein the polymer has a glass transition temperature of −45-10° C.

9. The adhesive composition according to claim 1, comprising:
20-30 wt. % of Portland cement;
3-10 wt. % of calcium sulphoaluminate cement;
optionally 4-8 wt. % latent hydraulic and/or pozzolanic binder materials;
35-55 wt. % of rubber particles;
3-10 wt. % of porous inorganic particles;
10-25 wt. % of a water soluble or water redispersible polymer;
0-5 wt. %, of one or more additives; and
wherein a proportion of aggregates with a particle density >2,000 $kg/m^3$ is <5 wt. %, and
whereby all amounts are with respect to the total weight of the adhesive composition in dry state.

10. A method for producing a processable adhesive composition, comprising the step of adding water to an adhesive composition according to claim 1.

11. A hardened adhesive composition obtainable by the method according to claim 10.

12. A structure comprising a cover element, whereby the cover element is fixed to the structure with an adhesive composition according to claim 1.

13. A method comprising applying an adhesive composition according to claim 1 to a tile as a tile adhesive.

14. A method comprising applying an adhesive composition according to claim 1 on floors, walls, or ceilings of a building or facility for acoustic damping, noise reduction and/or vibration reduction.

* * * * *